United States Patent
Sauermann

(10) Patent No.: US 9,203,697 B2
(45) Date of Patent: Dec. 1, 2015

(54) NETWORK NODE HOSTING A PLURALITY OF CONNECTIVITY SUPERVISION SESSIONS TOWARDS A PLURALITY OF ROUTER INTERFACES

(75) Inventor: Juergen Sauermann, Herzogenrath (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 188 days.

(21) Appl. No.: 13/996,404

(22) PCT Filed: Dec. 21, 2010

(86) PCT No.: PCT/EP2010/070401
§ 371 (c)(1),
(2), (4) Date: Jun. 20, 2013

(87) PCT Pub. No.: WO2012/084021
PCT Pub. Date: Jun. 28, 2012

(65) Prior Publication Data
US 2013/0282882 A1    Oct. 24, 2013

(51) Int. Cl.
*H04L 12/24* (2006.01)
*H04L 12/26* (2006.01)
*H04L 12/707* (2013.01)
*H04L 12/703* (2013.01)

(52) U.S. Cl.
CPC ........ *H04L 41/0816* (2013.01); *H04L 43/0811* (2013.01); *H04L 43/10* (2013.01); *H04L 45/22* (2013.01); *H04L 45/28* (2013.01); *H04L 41/06* (2013.01)

(58) Field of Classification Search
CPC .............................. H04L 12/24; H04L 41/0816
USPC .......... 709/217, 219, 221, 220; 370/228, 238, 370/241
See application file for complete search history.

(56) References Cited

U.S. PATENT DOCUMENTS 6,732,186 B1    5/2004 Hebert
7,937,438 B1 *  5/2011 Miller et al. .................. 709/203
(Continued)

FOREIGN PATENT DOCUMENTS

EP    1 981 211 A1    10/2008
WO   2008095538 A1    8/2008

OTHER PUBLICATIONS

"Path planning of mobile landmarks for localization in wireless sensor networks"—Koutsonikolas et al, Elsevier, Jul. 2007 https://engineering.purdue.edu/~dsnl/smdas/COMCOM07-2.pdf.*
(Continued)

*Primary Examiner* — Randy Scott
(74) *Attorney, Agent, or Firm* — Rothwell, Figg, Ernst & Manbeck, P.C.

(57) ABSTRACT

A network node (800) is configured for hosting a plurality of connectivity supervision sessions (810*a-e*) towards a plurality of router interfaces (808*a, b*) in a communication system (801). The network node (800) comprises a determining unit configured for determining a state of at least two connectivity supervision sessions (810*a-e*) of the plurality of connectivity supervision sessions (810*a-e*), wherein the at least two connectivity supervision sessions (810*a-e*) are at least partially overlapping, and an adapting unit configured for adapting the communication system (101, 801, 901) based on the determined states of the at least two connectivity supervision sessions (810*a-e*).

24 Claims, 6 Drawing Sheets

(56) References Cited

U.S. PATENT DOCUMENTS

2005/0080924 A1* 4/2005 Shang et al. .................. 709/239
2009/0225652 A1 9/2009 Vasseur et al.

OTHER PUBLICATIONS

Hinden "Virtual Router Redundancy Protocol (VRRP)" Network Working Group, 2004, 27 pages.
Katz et al. "BFD for Multihop Paths draft-ietf-bfd-multihop-09.txt" Network Working Group, 2010, 7 pages.
Katz et al. "Bidirectional Forwarding Detection draft-ietf-bfd-base-11.txt" Network Working Group, 2010, 46 pages.
Plummer "An Ethernet Address Resolution Protocol or Converting Network Protocol Addresses to 48.bit Ethernet Address for Transmission on Ethernet Hardware" Network Working Group, 1982, 8 pages.
Stewart "Stream Control Transmission Protocol" Network Working Group, 2007, 136 pages.

* cited by examiner

| session identification | session state | session path section | localized session path section | |
|---|---|---|---|---|
| 228a | down | 440a-d | 440a, 440b | 440a |
| 228b | down | 440a,440b,440f,440h, 440i,440j | 440a, 440b | |
| 228c | up | 440b,440c,440d, 440f,440g,440h | | 440a |
| 228d | up | 440g-j | | |

NETWORK NODE HOSTING A PLURALITY OF CONNECTIVITY SUPERVISION SESSIONS TOWARDS A PLURALITY OF ROUTER INTERFACES

CROSS REFERENCE TO RELATED APPLICATION(S)

This application is a 35 U.S.C. §371 National Phase Entry Application from PCT/EP2010/070401, filed Dec. 21, 2010, designating the United States, the disclosure of which is incorporated herein in its entirety by reference.

TECHNICAL FIELD

The invention relates to telecommunication, and in particular to a network node configured for hosting a plurality of connectivity supervision sessions towards a plurality of router interfaces in a communication network, a method of hosting a plurality of connectivity supervision sessions towards a plurality of router interfaces in a communication system, a computer program, and a computer-readable medium.

BACKGROUND

Nowadays there is a trend of Signaling System 7 (SS7) based telecommunication networks to evolve towards Internet Protocol (IP) based telecommunication networks. This trend comes along with a network architecture comprising host nodes and routers. For example, a host node is embodied as a Mobile Switching Center (MSC)-Server and is configured for connecting a subscriber of the host node with a peer end via one or more routers. Accordingly, new demands are posed to the IP based network regarding failure handling of connectivity failures between a host node and a router, between two routers, and between a router and the peer end, or more generally spoken between two network nodes.

It is known that connectivity between two routers may be supervised by so called routing protocols which generally accomplish failure handling of a connectivity failure between two routers or of one of the two routers by means of rerouting data between the two routers.

The connectivity between a host and a router may be supervised using connectivity supervision protocols such as a Virtual Router Redundancy Protocol (VRRP), a Bidirectional Forwarding Detection (BFD) Protocol, and a Stream Control Transmission Protocol (SCTP).

VRRP is defined, for example, according to RFC 3768, and accomplishes failure handling of a failure of a router by dynamically associating an IP address and a corresponding Media Access Control (MAC) address with a set of routers rather than with an individual router. As long as there is one operative router in the set, the IP and MAC addresses will be available. The VRRP protocol attempts to control which of the routers in the set will take over the IP and MAC addresses at any point in time.

However, the VRRP protocol does not work well in all site topologies, in particular not in those topologies having redundant Ethernet switches. In such topologies, which are typically used in telecommunications networks for redundancy reasons, uni-directional connectivity failure between a host and a router may occur and the VRRP protocol can then lead to identical IP and MAC addresses on different routers. Accordingly, such failure cases may lead to loss of data transmitted between the host and the routers. Further, VRRP represents a protocol supported by routers but not by host nodes such that connectivity failures associated with the host node may not be handled. Further, even if VRRP had been supported by a host node, the latter mentioned drawbacks of VRRP would be still present for failure handling of failures associated with the host node.

BFD is defined, for example, according to http://tools.ietf.org/html/draft-ietf-bfd-base-11, and is a protocol usable for detecting failures in a bidirectional communication path between two communication entities such as a host node and a router. Failure detection comprises detecting failures associated with interfaces of the host node and/or the router, and with connection links between the host node and the router.

However, BFD only provides supervision of an IP connectivity between a host node and a router but does not execute any failure resolution of detected connectivity failures.

SCTP is defined, for example, according to RFC 4960 and is a transfer protocol providing connectivity supervision of sessions between two network entities. Further, SCTP provides connectivity failure handling by means of selecting another session path instead of a failed session path.

However, basing failure handling of connectivity failures in an IP based network on SCTP may be difficult, since availability of session path diversity may not be supported in a large IP network.

Further, there are procedures known regarding the association of an IP address of one network entity with another network entity using an Address Resolution Protocol (ARP) as defined, for example, according to RFC 826.

Gratuitous ARP is a procedure usable for changing the association between an IP address and a MAC address and is executed by a host node. In the absence of VRRP (where IP addresses and MAC addresses are both moved from one interface to another interface) the MAC address is usually not changed (so that the MAC address always identifies an interface) while IP addresses can be moved from one interface to another interface by means of sending gratuitous ARP requests or responses from the interface to which an IP address was moved.

ARP cache expiration is a procedure usable for invalidating a timely limited association in a host node of an IP address of a router with a MAC address of the router, in order to dynamically account for changes within the IP network. In a case in which the association of the IP address of the router with the MAC address of the router may expire in the host node, either the host node or the router may have to resolve the association expiration. For example, the association expiration may be caused in that the IP address of the router may change, the router may fail and accordingly the MAC address of the router may turn invalid, or the connection between the host node and the router may fail.

However, ARP cache expiration may not allow for localizing a connectivity failure between the host node and the router. Further, resolving the association expiration may require network capacities in terms of periodically sending messages between the host node and the router.

Thus, the above mentioned failures handling mechanisms of a connectivity failure between a host node and a router may allow for failure handling of failures associated with the router but not with the host node or a connection link between the host node and the router. Further, a host node in the form of the MSC-S may represent a network entity in the telecommunication network configured for providing data transmissions for a plurality of subscribers, thereby failure handling of connectivity failures particularly associated with the host node may represent an important issue.

SUMMARY

It may be an objective of the invention to provide a possibility of an improved data transmission in the communication network. In particular, it may be an objective of the invention to provide an improved failure handling mechanism for connectivity failures between a host node and a plurality of router interfaces in a communication network for improving data transmission in the communication network.

In order to achieve the objectives defined above, a network node configured for hosting a plurality of connectivity supervision sessions towards a plurality of router interfaces in a communication system, a method of hosting a plurality of connectivity supervision sessions towards a plurality of router interfaces in a communication system, a program element, and a computer-readable medium according to the independent claims are provided.

According to an exemplary aspect of the invention, a network node configured for hosting a plurality of connectivity supervision sessions towards a plurality of router interfaces in a communication system is provided. The network node comprises a determining unit configured for determining a state of at least two connectivity supervision sessions of the plurality of connectivity supervision sessions. The at least two connectivity supervision sessions are at least partially overlapping. The network node comprises an adapting unit configured for adapting the communication system based on the determined states of the at least two connectivity supervision sessions.

According to another exemplary aspect of the present invention, a method of hosting a plurality of connectivity supervision sessions towards a plurality of router interfaces in a communication system is provided. The method comprises determining a state of at least two connectivity supervision sessions of the plurality of connectivity supervision sessions. The at least two connectivity supervision sessions are at least partially overlapping. The method comprises adapting the communication system based on the determined states of the at least two connectivity supervision sessions.

According to another exemplary aspect of the invention, a program element is provided. The program element is, when being executed by a processor, configured for carrying out or controlling a method of hosting a plurality of connectivity supervision sessions towards a plurality of router interfaces in a communication system as defined above.

According to another exemplary aspect of the invention, a computer-readable medium is provided. In the computer-readable medium a computer program for hosting a plurality of connectivity supervision sessions towards a plurality of router interfaces in a communication system is stored. The computer program is, when being executed by a processor, configured for carrying out or controlling a method of hosting a plurality of connectivity supervision sessions towards a plurality of router interfaces in a communication system as defined above.

According to another exemplary aspect of the invention, a communication system is provided. The communication system comprises a network node and a plurality of router interfaces. The communication system, particularly the network node, is configured for hosting a plurality of connectivity supervision sessions towards the plurality of router interfaces. The communication system, particularly the network node, comprises a determining unit configured for determining a state of at least two connectivity supervision sessions of the plurality of connectivity supervision sessions. The at least two connectivity supervision sessions are at least partially overlapping. The communication system, particularly the network node, comprises an adapting unit configured for adapting the communication system based on the determined states of the at least two connectivity supervision sessions.

In the context of the present application, the term "network node" may denote an entity of a communication network particularly configured for communicating with another network entities for transmitting payload data (for example, voice, audio and/or media) and data other than payload data (for example, data related to signaling).

The term "router interface" may denote a port of a network entity, particularly a network node (for example, a router or an Internet Protocol (IP) Line Board of a Mobile Switching Center (MSC)-Blade Cluster), configured for providing a communicative coupling to the communication system. In particular, a router interface may be configured for providing the communicative coupling between two network entities.

In particular, the term "router" may denote a network entity configured for communicatively coupling two network entities with one another. In particular, a router may be associated with one or more router interfaces. More generally spoken, the term "router" may refer to a reference point in the network towards which different hosts establish bidirectional connectivity, wherein some or all of these hosts may use the invention. If two hosts have bidirectional connectivity towards a particular point in the network, then the two hosts have, in most cases, also bidirectional connectivity between each other. The above-mentioned network entities configured for communicatively coupling two network entities (like devices usually denoted as routers in a network) are considered embodiments of such reference points reachable from many hosts, but the fact that these entities (routers) also route packets is not relevant for the invention. What is needed from a "router" in the sense of this invention is that it has at least one IP address, and that it responds to a supervision protocol like, for example, BFD.

The term "connectivity supervision session" may particularly denote a session usable for monitoring a connectivity of two network entities with one another, particularly of the network node and one or more router interfaces. In particular, the term may denote a session usable for testing a connectivity of the two network entities with one another. In particular, a connectivity supervision session may be associated with a (particularly potential or presently on-going) data transmission session between the two network entities.

The term "state of a connectivity supervision session" may particularly denote a status or a condition of the connectivity supervision session. In particular, the state of the connectivity supervision may denote a status of the network entities being involved in the connectivity supervision session (for example, a network node, (particularly a router interface of) a router, a switching node), and a status of (particularly a section of) a session link between the network entities.

The term "the at least two connectivity supervision sessions are at least partially overlapping" may particularly denote that the at least two connectivity supervision sessions may run partially parallel to another. In particular, the term may denote that a portion of a session link of each of the at least two connectivity supervision sessions may coincide. In particular, the term may denote that a section of a respective session path of each of the at least two connectivity supervision sessions may be identical.

A network node that is adapted to host one or more connectivity supervision sessions as described above may be denoted a "host node", and an interface of such a host providing a starting point for one or more connectivity supervision sessions may be denoted a "host interface".

In addition or alternatively to the definitions given above, a "router" or "router interface" may be a target or terminating point of one or more connectivity supervision sessions.

It is thus apparent that the same network node may act both as a host and router at the same time, and that one interface of a network node may at the same time act as a host interface and as a router interface, i.e. be a starting point for one or more connectivity supervision sessions as well as a terminating point for one or more (further) connectivity supervision sessions.

According to the exemplary aspects of the invention as defined above, a communication system may comprise a network node and a plurality of router interfaces, wherein a plurality of connectivity supervision sessions may be run between the network node and the plurality of router interfaces. The communication system may be adapted based on determining a state of at least two connectivity supervision sessions of the plurality of connectivity supervision sessions. In particular, the determining of the state of the at least two connectivity supervision sessions may result in a difference between the states, or may result in states of similar type, thereby providing information about the connectivity between the network node and the plurality of router interfaces. In particular, the adapting of the communication system may be based on a redundancy of the at least two connectivity supervision sessions particularly along session paths of the at least two connectivity supervision sessions. In particular, in a case in which a sufficient connectivity between the network node and the plurality of router interfaces may be determined, the adapting of the communication system may comprise taking no measures regarding a reconfiguration of the communication system. In particular, in a case in which an insufficient connectivity between the network node and the plurality of router interfaces may be determined, the adapting of the communication system may comprise taking adequate measures regarding a reconfiguration of the communication system for improving the connectivity in the communication network.

In particular, failure handling of a connectivity failure between the network node and the plurality of router interfaces may comprise mechanisms as to failure detection and failure resolution of the connectivity failure. Accordingly, the state of the at least two connectivity supervision sessions may be determined for the failure detection. The failure resolution may be based on adapting the communication system based on the determined states of the at least two connectivity supervision sessions, in order to improve or re-establish the connectivity between the network node and the plurality of router interfaces.

Thus, an easy, efficient and network capacity saving mechanism for a connectivity failure handling of connectivity failures between the network node and the plurality of router interfaces may be provided, since the mechanism may be based on only information related to the at least two connectivity supervision sessions.

Further, in contrast to prior art failure handling, the failure handling mechanism according to the exemplary aspects of the invention may provide a complete failure handling mechanism in terms of detecting a connectivity failure and resolving the connectivity failure. Particularly, localization of a failure can be improved or even made possible at all.

Further, by providing a potential failure handling mechanism for connectivity failures between the network node and the plurality of router interface, a continuous availability of the network node in the communication system and thus an improved data transmission in the communication system may be achieved.

Next, exemplary aspects of the network node will be explained. However, these embodiments also apply to the respective method, the respective communication system, the respective computer program, and the respective computer-readable medium.

In particular, the determining unit may be configured for determining a state of at least two connectivity supervision sessions of the plurality of sessions, wherein the at least two connectivity supervision sessions may be at least partially overlapping, and the adapting unit may be configured for adapting the communication system based on the determined states of the at least two connectivity supervision sessions at a state change of a connectivity supervision session, thereby triggering the adaption of the communication system immediately upon any occurred state change.

In particular, the host node may be configured for selecting a transmission path of a (particularly on-going or potential) data transmission between the network node and the plurality of router interfaces (particularly for the adapting of the communication system), whereby an improved and particularly continuous data transmission in the communication network may be provided.

The adapting unit may be configured for adapting a session path of one of the at least two connectivity supervision sessions. In particular, in a case in which a connectivity failure along a session path of one or more connectivity supervision sessions may occur, the respective connectivity supervision session(s) may be interrupted. In order to resolve the connectivity failure and to re-establish the one of the at least two connectivity supervision session, the session path of the one of the at least connectivity supervision sessions may be modified such that the adapted session path may not comprise the connectivity failure.

In particular, a state of the one of the at least two connectivity supervision sessions may also be adapted by adapting a session path of the one of the at least two connectivity supervision sessions.

In particular, in order to resolve a connectivity failure associated with a network entity involved in the connectivity supervision session, for example, the network node or a router interface, a respective component of network entity may be exchanged.

The network node may further comprise an associating unit configured for associating each of the determined states of the at least two connectivity supervision sessions with a respective session path of the at least two connectivity supervision sessions. Thus, the determined states of the at least two connectivity supervision sessions may be associated with, particularly correlated with, a site topology of the communication system. In particular, an association between a session identification of the at least two connectivity supervision sessions, the determined state of the at least two connectivity supervision sessions, and a session path of the at least two connectivity supervision sessions may be provided. In particular, the knowledge about this association may represent a basis for failure detection and may accordingly be used for the potential failure resolution in terms of the adaption of the communication system. In particular, the association may be stored in the network node using a respective table.

The network node may further comprise a session path section localization unit configured for localizing a session path section in a respective session path of one of the at least two connectivity supervision sessions. In particular, the session identification of the at least two connectivity supervision sessions, the determined state of the at least two connectivity supervision sessions, and/or the session path of the at least two connectivity supervision sessions may be used for localizing a session path section in the session path of one of the at least two connectivity supervision sessions for localizing the session path section. In particular, in a case of the states of the at least two connectivity supervision sessions being identical, the host node may be configured for selecting an identical or overlapping session path section(s) of the session path of the at least two connectivity supervision sessions for localizing the session path section. In particular, in a case of the states of the at least two connectivity supervision sessions being different, the host node may be configured for selecting a not identical or not overlapping session path section(s) of the session path of the at least two connectivity supervision sessions. Thus, since the at least two connectivity supervision sessions may be overlapping along one or more session path sections of the session paths, the knowledge about the state of the at least two connectivity supervision sessions may be used to determine one or more session path sections in which a connectivity failure may have occurred.

At least one of the associating unit and the session path section localization unit may be configured for dividing the respective session path of each of the at least two connectivity supervision sessions in sections. In particular, the session path of the at least two connectivity supervision sessions may be divided into session path sections close to the network node, session path sections between the network node and the plurality of router interfaces, and session path sections close to the plurality of router interfaces. In particular, a router associated with a router interface of the plurality of router interfaces may be associated with session path section. Thus, more information in terms of the session path sections of the session path of the at least two connectivity sessions may be provided for localizing the connectivity failure in the session path of one of the at least two connectivity supervision sessions. Further, the localizing of the session path section in the respective session path of the at least two connectivity supervision sessions may be systematically executed, since respective session path sections of the session path of the at least two connectivity sessions may be compared with one another. Further, by accurately localizing the connectivity failure in the site topology of the communication system, the adapting of the communication system may be significantly improved, since an adequate measure or adequate measures for adapting of the communication system may be selected which may account for the particular location of the connectivity failure.

The network node may further comprise a plurality of network interfaces configured for hosting the plurality of connectivity supervision sessions, wherein identification information may be associated with a network interface of the plurality of network interfaces, wherein the adapting unit may be configured for associating the identification information of the network interface with another network interface of the plurality of network interfaces. In particular, the another network interface may represent a default network interface not associated with an identification information or may represent an operative network interface associated with an identification information. In particular, the network node may comprise redundant network interfaces each of which being configured for hosting the plurality of connectivity supervision sessions and/or usable for transmitting and receiving data of a data transmission. In particular, the adapting of the communication system may be based on associating the identification information of the one network interface with the another network interface such that a connectivity failure close to the network interface, particularly at the network interface, of the network node may be resolved by redirecting a respective session path of a connectivity supervision session and/or a transmission path of a data transmission to and from the host node via the another network interface.

The adapting unit may be configured for assigning (particularly moving) the identification information of the network interface to the another network interface for the associating of the identification information of the network interface with the another network interface.

The identification information of the network interface may comprise a communication system protocol address, particularly an internet protocol (IP) address. Thus, the same communication protocol may be used by the network interface and the another network interface for communicating within the communication system, thereby removing the need of an establishment of new communication protocol procedures in the communication system subsequent to the association of the protocol address of the network interface with the another network interface. In particular, as to the identification information comprising an IP address, already existing associating procedures may be employed, thereby facilitating the communication system architecture. In particular, the IP address may be easily movable between network interfaces, since the IP address may represent variable identification information of a network interface which may be not bound to the network interface. In particular, the associating of the IP address of the network interface with the another network interface may represent a network capacity saving measure compared to associating both the IP address and a Media Access Control (MAC) address of the network interface with the another network interface. In particular, the MAC address of a network interface may represent identification information which is bound to the another network interface.

In particular, the associating of the IP address of the network interface with the another network interface may be published to the communication system particularly using a gratuitous ARP (Address Resolution Protocol) request/response procedure, whereby failures regarding a data transmission between the network node and the plurality of router interfaces may be accordingly prevented.

The network node may be configured for hosting a connectivity supervision session from a network interface towards another network interface. Thus, the network interface and the another network interface may be communicatively coupled. In particular, each of the network interface and the another network interface may be configured for hosting a plurality of connectivity supervision sessions, wherein the pluralities of connectivity supervision sessions may be associable with one another or may be not associable but independent from one another. In particular, a respective data transmission between the network interface and the another network interface may be enabled. In particular, in a case in which one of the at least two connectivity supervision sessions may be the connectivity supervision session hosted from the network interface towards the another network interface, a connectivity failure between the network interface and the another network interface may be detected.

A session path of one of the at least two connectivity supervision sessions may comprise a router interface of the plurality of router interfaces, wherein the adapting unit may be configured for selecting another router interface for the adapting of the communication system. Thus, in a case in which a connectivity failure may be detected at a session path section close to the router interface, the adapting of the communication system may be based on re-establishing a connectivity between the host node and the plurality of router interfaces via the another router interface instead of via the router interface. Accordingly, a data transmission may be (re-)directed between the host node and the another router interface.

The network node may be configured for hosting at least a part of the connectivity supervision sessions towards at least a part of the plurality of router interfaces via a switching node, wherein the adapting unit may be configured for sending information about the another router interface towards the switching node for the selecting of the another router interface. Thus, the host node is configured for being communicatively coupled to the switching node. Thus, the network node may be configured for causing the switching node to adapt the communication system in terms of (re-)establishing a connectivity between the switching node and the another router interface instead of the failed connectivity between the switching node and the router interface. Accordingly, an easy and network capacity saving measure for the adaption of the communication system may be provided.

In particular, the adapting unit may be configured for associating the identification of a network interface with another network interface and selecting another router interface for the adapting of the communication system particularly in a case in which a switching node interposed between the host node and the plurality of router interfaces may fail.

In particular, the switching node may be configured for updating routing information in the switching node based on the published association of the identification information of the network interface with the another network interface, in order to (re-)direct a data transmission towards the another network interface instead of towards the network interface.

At a change of a state of a connectivity supervision session of the plurality of connectivity supervision sessions, the determining unit may be configured for anew determining a state of at least two connectivity supervision sessions of the plurality of connectivity supervision sessions, wherein the at least two connectivity supervision sessions may be at least partially overlapping, and the adapting unit may be configured for anew adapting the communication system based on the determined states of the at least two connectivity supervision sessions. In particular, at every change of a state of a connectivity supervision session an adaption of the communication system may be triggered, whereby dynamic failure handling of connectivity failures between the network node and the plurality of router interfaces may be provided.

The state of a connectivity supervision session may comprise active and inactive states, wherein the active state of a connectivity supervision session may be associated with the connectivity supervision session transmitting information related to the connectivity supervision session, and wherein the inactive state of a connectivity supervision session may be associated with the connectivity supervision session not transmitting the information related to the connectivity supervision session. Accordingly, the network node may be configured for determining the operational state of at least two of the connectivity supervision sessions, in order to determine whether failure handling measures for resolving a connectivity failure may have to be executed.

The determining unit may be configured as an error determining unit configured for determining a connectivity error in the communication system and/or the adapting unit may be configured as an error resolving unit configured for resolving a connectivity error in the communication system. Thus, the network node may be configured for determining a connectivity failure between the network node and the plurality of router interfaces and accordingly for resolving the connectivity failure, in order to improve a data transmission in the communication system.

The network node may be configured as a host node of the communication system, particularly as a call control node of a telecommunication system, further particularly as a server of the telecommunication system, further particularly as a Mobile Switching Center (MSC)-Server of (particularly a core network of) a telecommunication system, further particularly as a Mobile Switching Center-Server (MSC-S) of (particularly a core network of) a telecommunication system, further particularly as a Mobile Switching Center (MSC)-Blade Cluster of (particularly a core network of) a telecommunication system, further particularly as an Internet Protocol (IP) Line Board of a MSC-Blade Cluster of (particularly a core network of) a telecommunication system. In particular, an IP Line Board may both be regarded as a host node and as a router depending on a respective communication partner of the IP Line Board. For example, in a case in which the IP Line Board may be communicatively coupled to Blades of an MSC-Blade Cluster, the IP Line Board may be regarded as a router, and in a case in which the IP Line Board may be communicatively coupled to routers, the IP Line Board may be regarded as a host node.

The network node may be configured for communicating via at least one of a Bidirectional Forwarding Detection (BFD) Protocol, an Internet Control Message Protocol (ICMP, particularly using a "ping" procedure), and an Address Resolution Protocol (ARP, particularly using an "ARP ping" procedure). In particular, already existing protocol types may be used for failure detecting and failure resolution of connectivity failures in the communication system. In particular, BFD may represent a protocol supported both by the network node and the plurality of router interfaces which may particularly comprise controlled fail-over times.

Next, further exemplary embodiments of the method of hosting a plurality of connectivity supervision sessions towards the plurality of router interfaces in a communication system will be explained. However, these embodiments also apply to the respective network node, the respective communication system, the respective computer program, and the respective computer-readable medium.

The method may be executed by a network node of the communication system, whereby the network node involved in the plurality of connectivity supervision sessions may actively control the connectivity state of the communication system.

Next, further exemplary embodiments of the communication system for hosting a plurality of connectivity supervision sessions towards a plurality of router interfaces in a communication system will be explained. However, these embodiments also apply to the respective network node, the respective method, the respective computer program, and the respective computer-readable medium.

In particular, the communication system may comprise one host node, two router interfaces, and optionally two switching nodes, particularly wherein the at least two router interfaces may be associated with one router or with two routers. In particular, the host node may comprise one or two host interfaces for hosting the plurality of connectivity supervision sessions.

The aspects defined above and further aspects of the invention are apparent from the examples of embodiments to be described herein after and are explained with reference to these examples of embodiment.

BRIEF DESCRIPTION OF THE DRAWINGS

Embodiments of the invention will be described in more detail herein after with reference to examples, but to which the scope of the invention is not limited.

DETAILED DESCRIPTION

Figure 1:
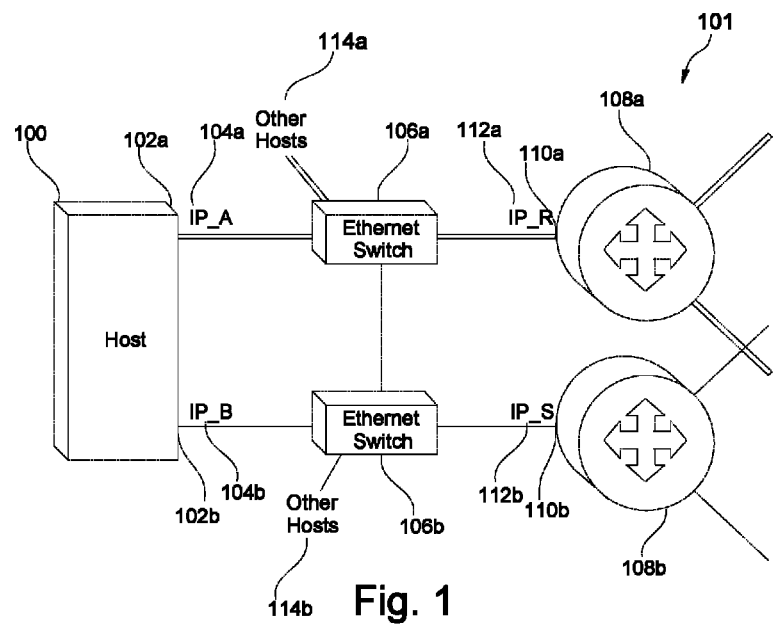
FIG. 1 is a diagram illustrating a communication system comprising a host node according to an exemplary embodiment of the invention.

The illustration in the drawing is schematic. In different drawings, similar or identical elements are provided with the same reference signs.

Referring to FIG. 1 a host node 100 of an IP based communication system 101 is shown. The host node 100 may exemplarily be embodied as a Mobile Switching Center Server (MSC-S) of a core network interposed between a radio access network (for example, E-UTRAN) and an IP based network, but is not restricted to such an embodiment. The host node 100 comprises host interfaces 102a, b each of which being associated with an IP address 104a, b (denoted in FIG. 1 by IP_A, IP_B).

The communication system 101 further comprises Ethernet switches 106a, b, and two routers 108a, b each of which comprising a router interface 110a, b. Each of the router interfaces 110a, b is associated with an IP address 112a, b (denoted in FIG. 1 as IP_R, IP_S).

The host node 100 is communicatively coupled to the Ethernet switches 106a which are communicatively coupled to the routers 108a, b. Further host nodes 114a, b are communicatively coupled to the Ethernet switches 106a, b.

Connectivity failures between the host node 100 and the routers 108a, b are detected and resolved using a method of hosting a plurality of connectivity supervision sessions towards a plurality of router interfaces according to an exemplary embodiment of the invention, as will be explained with reference to FIGS. 2 to 7.

Figure 2:
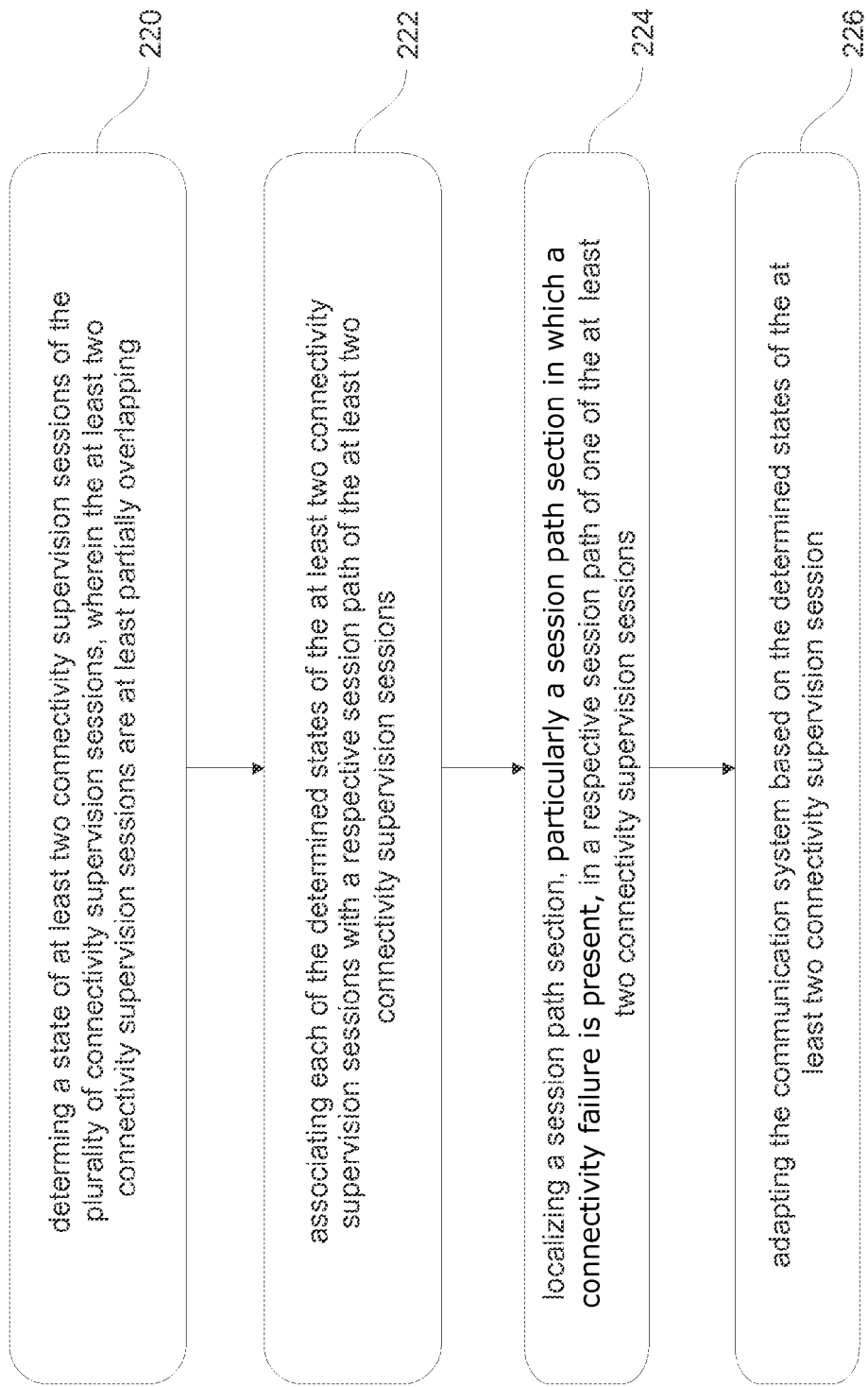
FIG. 2 is a flowchart illustrating a method of hosting a plurality of connectivity supervision sessions towards a plurality of router interfaces in the communication system of FIG. 1 according to an exemplary embodiment of the invention.

It is noted that, referring to other hosts not explicitly shown in the Figures, e.g. host node 114a may comprise a likewise constitution as the host node 100 and thus may also be configured for executing the method illustrated in FIG. 2, whereas host node 114b e.g. may comprise a different constitution and thus may be not configured for executing the method illustrated in FIG. 2. That is, not all hosts in a site need to perform the method illustrated in FIG. 2, but may use other methods instead. However, all hosts using the method illustrated in FIG. 2 not only improve their connectivity towards the routers, but also, as a side effect to all other nodes using the same method.

Referring to FIG. 2, the method of hosting the plurality of connectivity supervision sessions towards the plurality of router interfaces 108a, b in the communication system 101 according to the exemplary embodiment of the invention will be explained. The method is executed by the host node 100.

According to a block 220, a state of at least two connectivity supervision sessions of a plurality of connectivity supervision sessions is determined with the at least two connectivity supervision sessions are at least partially overlapping. According to another block 222, each of the determined states of the at least two connectivity supervision sessions are associated with a respective session path of the at least two connectivity supervision sessions. According to another block 224, a session path section, particularly a session path section in which a connectivity failure is present, in a respective session path of one of the at least two connectivity supervision sessions is localized, as will be explained by way of example further below. According to another block 226, the communication system 101 is adapted based on the determined states of the at least two connectivity supervision sessions.

Figure 3:
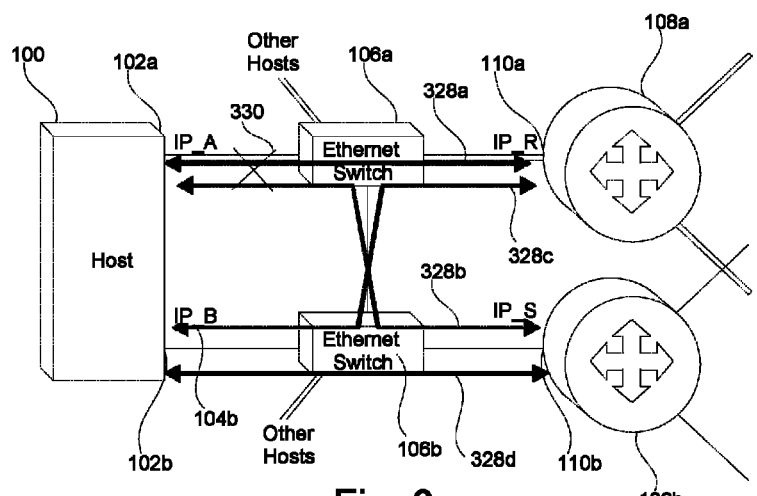
FIG. 3 is a diagram illustrating the communication network of FIG. 1 with the host node hosting the plurality of connectivity supervision sessions towards the plurality of router interfaces in accordance with the method of FIG. 2.

When executing the method of FIG. 2, the host node 100 runs a plurality of connectivity supervision sessions 328a-d for monitoring a connectivity towards a peer end of the IP network (FIG. 3). A first connectivity supervision session 328a connects the host interface 102a with the router interface 110a through the Ethernet switch 106a. A second connectivity supervision session 328b runs from the host interface 102a to the router interface 110b via the Ethernet switches 106a, b. A third connectivity supervision session 328c runs from the host interface 102b to the router interface 110a via the Ethernet switches 106a, b. A fourth connectivity supervision session 328d runs from the host interface 102b to the router interface 110b via the Ethernet switch 106b.

In the following, it is assumed that a connectivity failure indicated by a cross 330 has occurred between the host interface 102a and the Ethernet switch 106a.

In order to localize the connectivity failure 330, the host node 100 determines a state of the connectivity supervision sessions 328a, b which are partially overlapping. This determination results in the connectivity supervision session 328a comprising an inactive state called a "down" state and the connectivity supervision session 328b also comprising a down state.

In order to enhance the accuracy of localizing the connectivity failure 330, the host node 100 also determines a state of the connectivity supervision sessions 328c, d both of which being partially overlapping with the connectivity supervision sessions 328a, b. In particular, the connectivity supervision session 328c is partially overlapping with the connectivity supervision sessions 328a, and the connectivity supervision session 328d is partially overlapping with the connectivity supervision sessions 328b. The determination results in that the connectivity supervision sessions 328c, b comprise active states called "up states".

Instead of determining the state of both connectivity supervision sessions 328c, d, the host node 100 may determine only one of the states of the connectivity supervision sessions 328c, d.

Figures 4, 5:
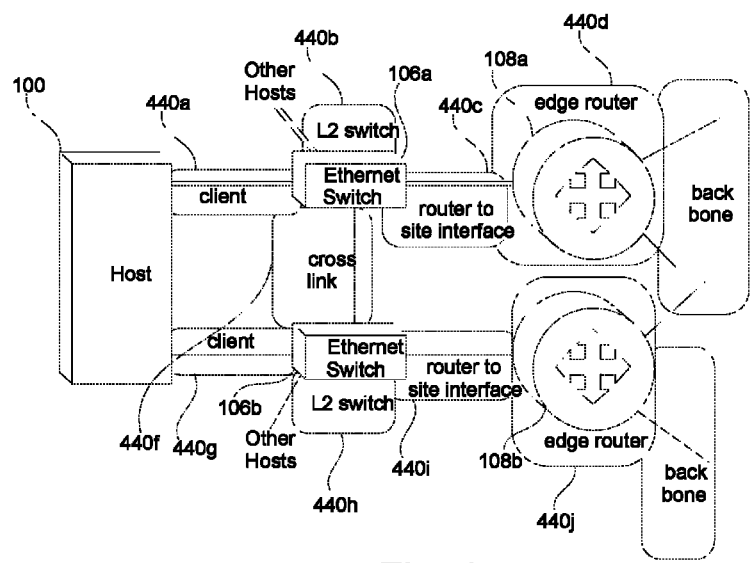
FIG. 4 is diagram illustrating the communication system of FIG. 1 with the host node dividing session paths between the host node and the plurality of router interfaces into sections in accordance with the method of FIG. 2.
FIG. 5 is a table usable in accordance with the method of FIG. 2.

In order to associate each of the determined states of the connectivity supervision sessions 328a-d with a respective session paths of the connectivity supervision sessions 328a-d, the host node 100 divides the session paths of the connectivity supervision sessions 328a-d into sections 440a-k (FIG. 4).

The connectivity session 328a comprises the four session path sections 420a-d. The session path section 440a is located between the host interface 102a and the Ethernet switch 106a. The session path section 440b is associated with the Ethernet switch 106a, i.e. the session path sections 440b refers to the through-connection of the Ethernet switch 106a. The session path section 440c is located between the Ethernet switch 106a and the router interface 110a. The session path section 440d is associated with the router 108a, i.e. the session path sections 440d refers to the router interface 110a of the router 108a.

The connectivity session 328b is divided into the six session path sections 420a, b, f, h, i, j. The session path section 440f is a cross link between the Ethernet switch 106a and the Ethernet switch 106b. The session path section 440h refers to the Ethernet switch 106b. The session path section 440i is located between the Ethernet switch 106b and the router interface 110b. The session path section 440j is associated with router interface 110b of the 108b.

The connectivity session 328c is divided into the six session path sections 420b, c, d, f, g, h. Here, the session path section 440g is located between the host interface 102b and the Ethernet switch 106b.

The connectivity session 328d is divided into the four session path sections 420g-j.

The result of the association of the determined state of the connectivity supervision session 328a-d with the session path of the connectivity supervision session 328a-d is summarized in the table illustrated in FIG. 5. Accordingly, the connectivity supervision session 328a comprises the down state and is associated with the session path sections 440a-d. The connectivity supervision session 328b comprises the down state and is associated with the session path sections 440a, b, f, h, i, j. The connectivity supervision session 328c comprises the up state and is associated with the session path sections 440b, c, d, f, g, h. The connectivity supervision session 328d comprises the up state is associated with the session path sections 440g-j.

The host node 100 then localizes the connectivity failure 330 in the session paths of the connectivity sessions 328a, b comprising the down states. To this end, the host node 100 compares the association between the states of the connectivity supervision sessions 328a, b and the session path sections 440a-d, f, h-j of the connectivity supervision sessions 328a-d in that the host node 100 identifies identical session path sections 420a, b. Further, the host node 100 uses the association between the session states of the connectivity supervision sessions 328a, c and the session path sections 440a-h of the connectivity supervision sessions 328a, c to identify which session path section of the session path sections 440a, b is associated with the failure 330. This identification results in the session path section 420a.

Next, the host node 100 adapts the communication system, as will be explained with reference to FIGS. 6 and 7.

Figure 6:
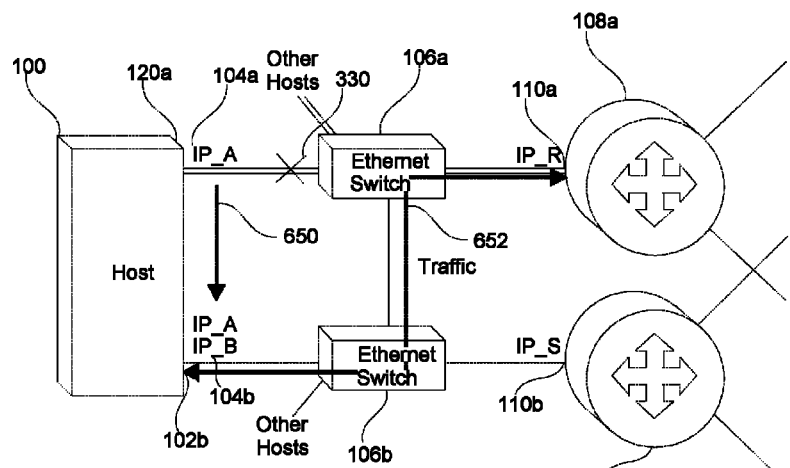
FIG. 6 is a diagram illustrating the communication system of FIG. 1 with the host node adapting the communication system in accordance with the method of FIG. 2.

In FIG. 6, the connectivity failure 330 occurs in the session path section 440a, as illustrated in FIG. 4. In order to adapt the session path of the connectivity supervision sessions 328a, b and a respective data transmission path of a data transmission both comprising the session path sections 440a, the host node 100 associates the IP address 104a of the host interface 102a with the host interface 102b by assigning the IP address 104a of the host interface 102a with the host interface 102b, as illustrated by an arrow 650. Accordingly, the host interface 102b comprises the two IP addresses 104a, b, namely the IP address 104a formerly assigned to the host interface 102a and the IP address 104b. Further, the host node 100 leaves respective MAC addresses of the host interfaces 102a, b unchanged, i.e. the MAC address associated with the host interface 102b is not assigned to the host interface 102b.

Thus, the connectivity supervision session 328a runs from the host interface 102b towards the router interface 110a via the Ethernet switches 106a, b. Further, the connectivity supervision session 328b runs from the host interface 102b towards the router interface 110b via the Ethernet switch 106b.

Alternatively, the host interface 102b may represent a default host interface being not associated with an IP address. Accordingly, after assigning the host interface 102b with the IP address 104a of the host interface 102a, the host interface 102b is associated only with the IP address 104a.

By assigning of the IP address 104a of the host interface 102a to the host interface 102b of the host node 100, a respective transmission path of a potential data transmission 652 may also runs from the host interface 102b towards the Ethernet switch 106b, from the Ethernet switch 106b towards the Ethernet switch 106a and from the Ethernet switch 106a towards the router interface 108a.

Figure 7:
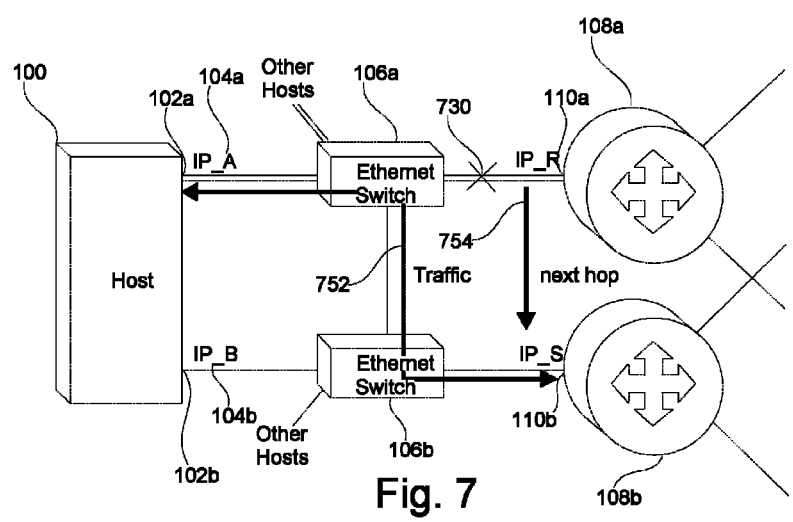
FIG. 7 is a diagram illustrating the communication system of FIG. 1 with the host node adapting the communication system in accordance with the method of FIG. 2.

Referring to FIG. 7, it is assumed that a connectivity failure 730 has occurred in the session path section 440c (FIG. 4) of the connectivity supervision sessions 328a, c between the Ethernet switch 106a and the router interface 110a. In order to resolve the connectivity failure 730 and to provide connectivity from the host node 100 towards the peer end of the communication network 101, the host node 100 sends respective information to the Ethernet switch 106a for selecting the router interface 110b of the router 108b instead of the router interface 110a of the router 108a, as illustrated by an arrow 754.

After the selection, the connectivity supervision session 328a runs from the host interface 102a towards the router interface 110b via the Ethernet switches 106a, b. Further, the connectivity supervision session 328c runs from the host interface 102b towards the router interface 110b via the Ethernet switch 106b.

Further, the Ethernet switch 106a re-routes data of a data transmission 752 between the host interface 102a and the router interface 110a via the Ethernet switch 106b which further re-routes the data transmission 752 towards the router interface 110b.

Figure 8:
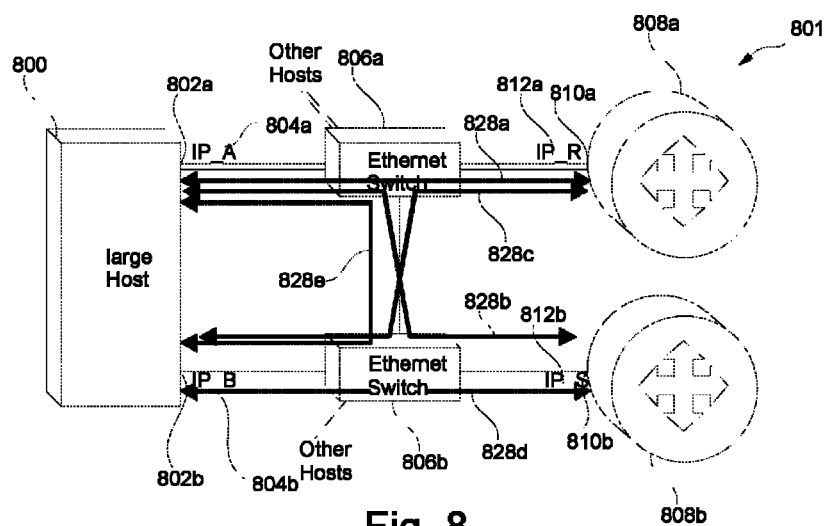
FIG. 8 is a diagram illustrating a communication system comprising a host node according to another exemplary embodiment of the invention.

Referring to FIG. 8, a communication system 801 comprising a host node 800 according to another exemplary embodiment of the invention is illustrated. The communication system 801 is identical to the communication system 101 of FIG. 1 except for the constitution of the host node 800. The host node 800 is adapted as Mobile Switching Center (MSC)-Blade Cluster comprising a plurality of blades each of which being associated with a host interface 802a, b. The host interfaces 802a, b are communicatively coupled towards the IP communication system 801 and are communicatively coupled between one another. Data transmission between the host interfaces 802a, b allows for exchange information between the blades associated with the host interfaces 802a, b.

When executing a method of hosting a plurality of connectivity supervision sessions towards a plurality of router interfaces in a communication network according to another exemplary embodiment of the invention, the host node 800 runs connectivity supervision session 828a-d being identical the connectivity supervision sessions 328a-d. Further, the host node 800 runs a connectivity supervision session 828e between the host interfaces 802a and the host interface 802b via the Ethernet switches 806a, b. Providing the connectivity supervision session 828e allows for determining and resolving connectivity failures occurring between the blades associated with the host interfaces 802a, b. Such connectivity failures may be associated with the session path sections 440a, b, f, g, h between the host interfaces 802a, b and the Ethernet switches 806a, b, and between the Ethernet switches 806a, b.

Figure 9:
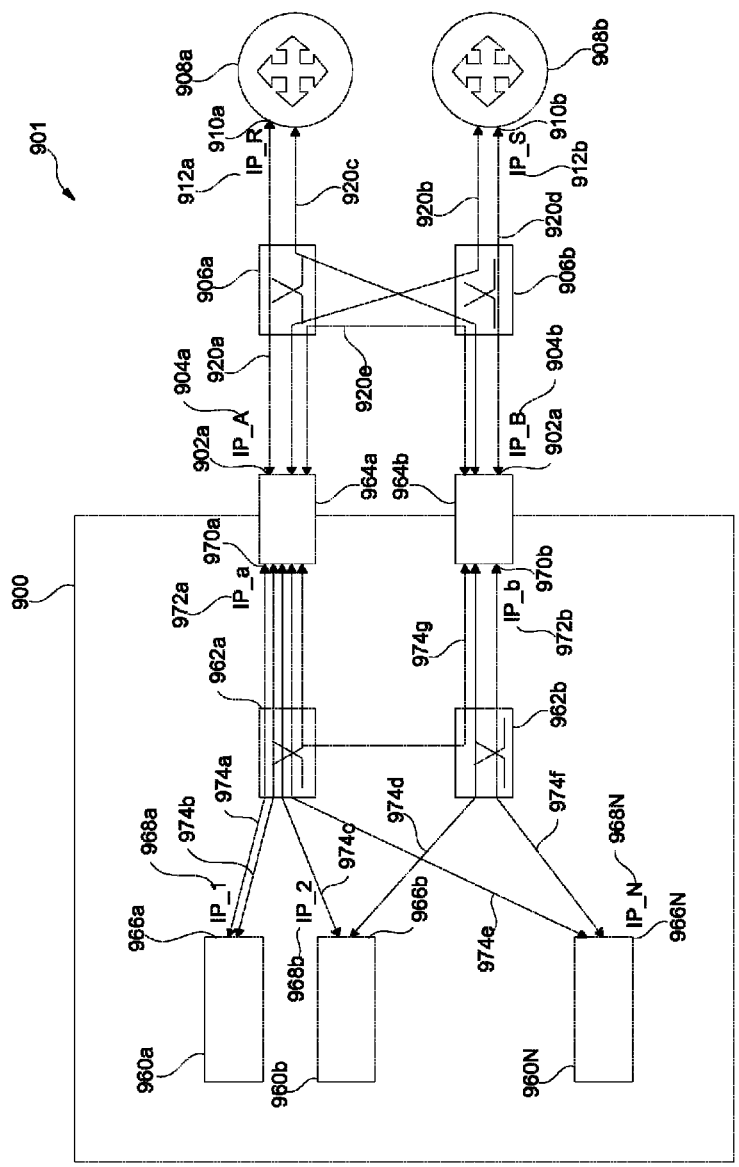
FIG. 9 is a diagram illustrating a communication system comprising a host node according to another exemplary embodiment of the invention.

Referring to FIG. 9, a further communication system 901 comprising a host node 900 according to another exemplary embodiment of the invention is illustrated. The communication system 901 is identical to the communication system 801 of FIG. 8 except for the constitution of the host node 900. The host node 900 is adapted as MSC Blade Cluster and is communicatively coupled to routers 908a, b via Ethernet switches 906a, b. The host node 900 comprises N MSC blades 960a-N, two switches 962a, b and two IP line boards 964a, b. The MSC Blades 960a-c are communicatively coupled to the switches 962a, b, and the switches 962a, b are communicatively coupled to the IP line boards 964a, b. Each of the MSC blades 960a-N of the host node 900 comprises a blade interface 966a-N which is associated with an IP address 968a-N denoted by IP_1, IP_2, ..., IP_N. Further, each of the IP line boards 962a, b comprises an interface 970a, b towards the MSC blades 960a-N which is associated with an IP address 972a, b denoted by IP_a, IP_b.

When executing a method of hosting a plurality of connectivity supervision sessions towards a plurality of router interfaces in a communication network according to another exemplary embodiment of the invention, the host node 900 may be regarded as the host node executing the method with the IP Line Boards 964a, b being regarded as the host interfaces.

Alternatively or in addition, the IP Line Boards 964a, b serve as host nodes each of which comprising one host interface 902a, b towards the communication system 901 and, in particular, provides a connectivity towards the routers 908a, b. Accordingly, each of the IP Line Boards 964a, b run connectivity supervision sessions 928a-e which are identical to the connectivity supervision sessions 828a-e illustrated in FIG. 3.

Alternatively or in addition, when considering an internal constitution of the host node 900, the MSC blades 960a-N serve as host nodes towards the IP line boards 964a, d, and the IP line boards 964a, b may be regarded as routers. When executing the method illustrated in FIG. 2, the MSC blades 960a-N run connectivity supervision sessions 974a-f from the respective blade interfaces 966a-N towards the interfaces 966a, b of the IP line boards 964a, b. In particular, the MSC Blade 960a hosts the connectivity supervision sessions 974a, b from the blade interface 966a towards the line board interface 970a via the Ethernet switch 962a. The MSC Blade 960b hosts the connectivity supervision session 974c from the blade interface 966b towards the line board interface 970a via the Ethernet switch 962a and hosts the connectivity supervision session 974d from the blade interface 966b towards the line board interface 970b via the Ethernet switch 962b. The MSC Blade 960N hosts the connectivity supervision session 974e from the blade interface 966N towards the line board interface 970a via the Ethernet switch 962a and hosts the connectivity supervision session 974f from the blade interface 966N towards the line board interface 970b via the Ethernet switch 962b.

Thus, connectivity supervision is provided within an internal constitution of the host node 900 between the MSC Blades 960a-N and the IP line boards 964a, b and within in the communication system 901 between the host node 900 and the router interfaces 910a, b.

Figure 10:
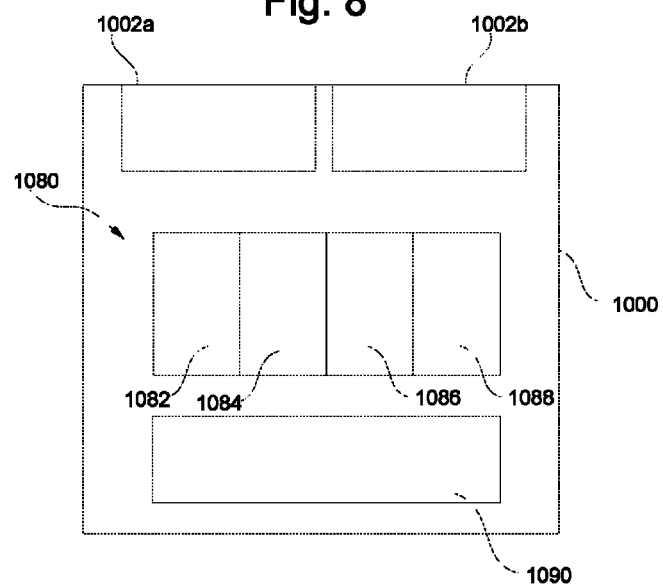
FIG. 10 illustrates a constitution of a host node according to another exemplary embodiment of the invention.

Referring to FIG. 10, a constitution of a host node 1000 according to another exemplary embodiment of the invention will be explained.

The host node 1000 comprises host interfaces 1002a, b each of which being configured as transceiver units. Accordingly, each of the host interfaces 1002a, b is configured for receiving data and sending data. Further, the host node 1000 comprises a processing unit 1080 configured for processing data associated with a method of hosting a plurality of connectivity supervision sessions towards a plurality of router interfaces in a communication system. The processing unit 1080 comprises a determining unit 1082 configured for determining a state of at least two connectivity supervision sessions of the plurality of connectivity supervision sessions, wherein the at least two connectivity supervision sessions are at least partially redundant. The processing unit 1080 comprises an associating unit 1084 configured for associating each of the determined states of the at least two connectivity supervision sessions with a respective session path of the at least two connectivity supervision sessions. The processing unit 1080 further comprises a session path section localization unit 1086 configured for localizing a session path section in a respective session path of one of the at least two connectivity supervision sessions. The processing unit 1080 further comprises an adapting unit 1088 configured for adapting the communication system based on the determined states of the at least two connectivity supervision sessions. Further, the host node 1000 comprises a storage unit 1090 configured for storing data associated with the method of hosting a plurality of connectivity supervision sessions towards a plurality of router interfaces in the communication system.

It is apparent that the above embodiments are exemplary and that variations or modifications thereof are conceivable. Particularly, a host node 100, 800, 900, 1000 may comprise more than two, i.e. an arbitrary plurality of host interfaces, or only one host interface. Just as well, a communication system 101, 801, 901 may comprise more than one host node and/or an arbitrary number of routers. Further, it is pointed out that there is not necessarily a distinction between host nodes and routers resp. host and router interfaces. This can readily be seen from the embodiment of FIG. 9, in which the IP line boards 964a, b may act as host interfaces or even host nodes when seen from the "outside" of the host node 900, i.e. when seen from the routers 908a, b, and may act as routers when seen from the "inside" of the host node 900, i.e. when seen from the MSC blades 960a-N.

More generally, it may be said that—in addition or in alternative to other definitions provided herein or known by a person skilled in the art—a host node in the sense of this invention is a network node that is adapted to host one or more connectivity supervision sessions as described above, and that a host interface is a starting point for one or more connectivity supervision sessions, while a router or router interface is a target or terminating point of one or more connectivity supervision sessions. However, it is clear that the same network node may act both as a host and router at the same time, and that one interface of a network node may at the same time act as a host interface and as a router interface, i.e. be a starting point for one or more connectivity supervision sessions as well as a terminating point for one or more (further) connectivity supervision sessions.

The invention claimed is:
1. A network node configured for hosting a plurality of connectivity supervision sessions towards a plurality of router interfaces in a communication system, the network node comprising:

a determining unit configured for determining a state of at least two connectivity supervision sessions of the plurality of connectivity supervision sessions, wherein the at least two connectivity supervision sessions are at least partially overlapping, a session path section localization unit configured for localizing a session path section in a respective session path of one of the at least two connectivity supervision sessions, and an adapting unit configured for adapting the communication system based on the determined states of the at least two connectivity supervision sessions.

2. The network node according to claim 1, wherein the adapting unit is configured for adapting a session path of one of the at least two connectivity supervision sessions.

3. The network node according to claim 1, the network node further comprising:

an associating unit configured for associating each of the determined states of the at least two connectivity supervision sessions with a respective session path of the at least two connectivity supervision sessions.

4. The network node according to claim 1, wherein at least one of the associating unit and the session path section localization unit is configured for dividing the respective session path of each of the at least two connectivity supervision sessions.

5. The network node according to claim 1, the network node further comprising:

a plurality of network interfaces configured for hosting the plurality of connectivity supervision sessions, wherein identification information is associated with a network interface of the plurality of network interfaces, and wherein the adapting unit is configured for associating the identification information of the network interface with another network interface of the plurality of network interfaces.

6. The network node according to claim 5, wherein the adapting unit is configured for assigning the identification information of the network interface to the another network interface for the associating of the identification information of the network interface with the another network interface.

7. The network node according to claim 5, wherein the identification information of the network interface comprises a communication system protocol address.

8. The network node according to claim 5, wherein the network node is configured for hosting a connectivity supervision session from a network interface towards another network interface.

9. The network node according to claim 1, wherein a session path of one of the at least two connectivity supervision sessions comprises a router interface of the plurality of router interfaces, wherein the adapting unit is configured for selecting another router interface for the adapting of the communication system.

10. The network node according to claim 9, configured for hosting at least a part of the connectivity supervision sessions towards at least a part of the plurality of router interfaces via a switching node, wherein the adapting unit is configured for sending information about the another router interface towards the switching node for the selecting of the another router interface.

11. The network node according to claim 1, wherein, at a state change of a connectivity supervision session of the plurality of connectivity supervision sessions the determining unit is configured to determine a state of at least two connectivity supervision sessions of the plurality of connectivity supervision sessions, wherein the at least two connectivity supervision sessions are at least partially overlapping, and wherein the adapting unit is configured to adapt the communication system based on the determined states of the at least two connectivity supervision sessions.

12. The network node according to claim 1, wherein the state of a connectivity supervision session comprises active and inactive states, wherein the active state of a connectivity supervision session is associated with the connectivity supervision session transmitting information related to the connectivity supervision session and wherein the inactive state of a connectivity supervision session is associated with the connectivity supervision session not transmitting the information related to the connectivity supervision session.

13. The network node according to claim 1, wherein the determining unit is configured as an error determining unit configured for determining a connectivity error in the communication system and/or the adapting unit is configured as an error resolving unit configured for resolving a connectivity error in the communication system.

14. The network node according to claim 1, wherein the network node is configured as one or more of a host node of the communication system, a call control node of a telecommunication system, a telecommunication system, a Mobile Switching Center-Server of a telecommunication system, a Mobile Switching Center-Blade Cluster of a telecommunication system, and an Internet Protocol Line Board of a Mobile Switching Center-Blade Cluster of a telecommunication system.

15. The network node according to claim 1, wherein the network node is configured for communicating via at least one of a Bidirectional Forwarding Detection Protocol, an Internet Control Message Protocol, and an Address Resolution Protocol.

16. A method of hosting a plurality of connectivity supervision sessions towards a plurality of router interfaces in a communication system, the method comprising:

determining a state of at least two connectivity supervision sessions of the plurality of connectivity supervision sessions, wherein the at least two connectivity supervision sessions are at least partially overlapping, localizing a session path section in a respective session path of one of the at least two connectivity supervision sessions, and adapting the communication system based on the determined states of the at least two connectivity supervision sessions.

17. The method according to claim 16, the method being executed by a network node of the communication system.

18. The method according to claim 16, the method further comprising:

associating each of the determined states of the at least two connectivity supervision sessions with a respective session path of the at least two connectivity supervision sessions.

19. The method according to claim 16, wherein the communication system comprises a plurality of network interfaces configured for hosting the plurality of connectivity supervision sessions, wherein identification information is associated with a network interface of the plurality of network interfaces, and wherein the adapting comprises associating the identification information of the network interface with another network interface of the plurality of network interfaces.

20. The method according to claim 19, wherein the adapting comprises assigning the identification information of the network interface to the another network interface for the associating of the identification information of the network interface with the another network interface.

21. The method according to claim 19, wherein a connectivity supervision session is hosted from a network interface towards another network interface.

22. The method according to claim 16, wherein a session path of one of the at least two connectivity supervision sessions comprises a router interface of the plurality of router interfaces, wherein the adapting comprises selecting another router interface for the adapting of the communication system.

23. The method according to claim 22, wherein at least a part of the plurality of connectivity supervision sessions are connected towards at least a part of the router interfaces via a switching node, wherein the adapting comprises sending information about the another router interface towards the switching node for the selecting of the another router interface.

24. A non-transitory computer program which, when being executed by a processor, causes the processor to be configured to carry out or control a method of hosting a plurality of connectivity supervision sessions towards a plurality of router interfaces in a communication system, the method comprising:

determining a state of at least two connectivity supervision sessions of the plurality of connectivity supervision sessions, wherein the at least two connectivity supervision sessions are at least partially overlapping, localizing a session path section in a respective session path of one of the at least two connectivity supervision sessions, and adapting the communication system based on the determined states of the at least two connectivity supervision sessions.

* * * * *